United States Patent
Dattathreya

(10) Patent No.: US 7,493,334 B1
(45) Date of Patent: Feb. 17, 2009

(54) SYSTEM AND METHOD FOR HANDLING INVALID CONDITION OF A DATA ELEMENT

(75) Inventor: Macam S. Dattathreya, Sterling Heights, MI (US)

(73) Assignee: International Business Machines Corporation, Armonk, NY (US)

(*) Notice: Subject to any disclaimer, the term of this patent is extended or adjusted under 35 U.S.C. 154(b) by 0 days.

(21) Appl. No.: 12/015,636

(22) Filed: Jan. 17, 2008

(51) Int. Cl.
*G06F 17/30* (2006.01)

(52) U.S. Cl. .................. 707/102; 707/101; 715/224; 717/169; 717/172

(58) Field of Classification Search .......... 707/101, 707/102, 104.1; 715/224; 717/101, 169, 717/172, 117, 155
See application file for complete search history.

(56) References Cited

U.S. PATENT DOCUMENTS

| | | | |
|---|---|---|---|
| 5,276,791 A * | 1/1994 | Palmer ................... 715/207 |
| 6,065,148 A | 5/2000 | Obermeier et al. |
| 6,134,628 A | 10/2000 | Hamadani |
| 6,425,121 B1 | 7/2002 | Phillips |
| 6,751,634 B1 | 6/2004 | Judd |
| 6,941,310 B2 | 9/2005 | Ahad et al. |
| 7,007,026 B2 * | 2/2006 | Wilkinson et al. ........... 707/10 |
| 7,080,049 B2 * | 7/2006 | Truitt et al. ................ 705/75 |
| 7,089,583 B2 * | 8/2006 | Mehra et al. ................ 726/3 |
| 7,231,082 B2 * | 6/2007 | Lenoir ..................... 382/154 |
| 7,320,090 B2 * | 1/2008 | Coulter et al. ............. 714/30 |
| 2002/0046294 A1 * | 4/2002 | Brodsky et al. ........... 709/246 |
| 2002/0116474 A1 | 8/2002 | Copeland et al. |
| 2005/0182792 A1 * | 8/2005 | Israel et al. .............. 707/104.1 |
| 2006/0167863 A1 * | 7/2006 | Cole et al. .................. 707/3 |
| 2006/0259388 A1 * | 11/2006 | Morea et al. ............... 705/35 |

\* cited by examiner

*Primary Examiner*—Leslie Wong
(74) *Attorney, Agent, or Firm*—MaxValueIP, LLC

(57) ABSTRACT

The present invention provides an application logic to detect the invalid value of a given mandatory data element and allow the regular program flow to fix the necessary data when the blank value is encountered by the work flow. This approach eliminates the need for expensive and complex data fix programs or database administrator's intervention.

1 Claim, 2 Drawing Sheets

SYSTEM AND METHOD FOR HANDLING INVALID CONDITION OF A DATA ELEMENT

BACKGROUND OF THE INVENTION

The present invention relates generally to software application. More specifically, the present invention relates a method of validity of a mandatory data element's value may change during the life cycle of a software application.

Databases are central to meaningful transactions on a computer regardless of whether a computer is networked or not. A file stored in an ordinary personal computer hard drive is, ultimately, an entry in a database accessed through a file access table having file names and a plurality of memory locations. Moreover, changes to this file may be incremental in that the entire file is not rewritten immediately, but instead, a record is made of the desired changes. If two different entities try to access and modify a typical file, traditionally only one is permitted with the other one being locked out. This is a safety feature designed to avoid inconsistent changes that may interfere with the operation of software. Commercial databases are designed for different contexts but often have similar concerns during their use by client applications. A data element is a A named unit of data that, in some contexts, is considered indivisible and in other contexts may consist of data items.

A named identifier of each of the entities and their attributes that are represented in a database.

A basic unit of information built on standard structures having a unique meaning and distinct units or values.

In electronic recordkeeping, a combination of characters or bytes referring to one separate item of information, such as name, address, or age.

Data elements usage can be discovered by inspection of software applications or application data files through a process of manual or automated application discovery and understanding. Once data elements are discovered they can be registered in a metadata registry. An existing data record opened for a given operation can have more than one data elements and some of them are mandatory data elements. The validity of a mandatory data element's value may change during the life cycle of a software application. The invalid values of a data element cause application errors or unexpected results. This is often resolved by database updates to fix the invalid data, but it requires database administrator intervention and may not always be feasible. The invalid condition can happen frequently, and it may be difficult to find a valid value for a given invalid data. This makes the database fix or any data fix programs harder to implement.

The present invention provides a unique way of handling such situation where known solutions require significant time and efforts to implement.

SUMMARY OF THE INVENTION

The present invention provides an application logic to detect the invalid value of a given mandatory data element, set the value to blank, and allow the regular program flow to fix the necessary data when the blank value is encountered by the work flow. This approach eliminates the need for expensive and complex data fix programs or database administrator's intervention.

DETAILED DESCRIPTION OF THE PREFERRED EMBODIMENTS

The present invention provides application logic to detect the invalid value of a given mandatory data element and set the value to blank and allow the regular program flow to fix the necessary data when the blank value is occurred.

1. If a given mandatory data element's value is invalid it will be set to blank so that the normal required checks on that element take over the task of fixing the value with the built in blank value handling in the workflow steps.

2. This invention does not require any database administrator invention or any costly complex fixer batch programs.

3. Since the invalid value is set to blank for the mandatory data element, the actual value for it will be fixed during the workflow.

4. No extra effort is needed if the value becomes invalid and doesn't need a very complex logic to determine the valid value for it outside the existing workflow's logic.

An assumption is that all software applications are built to handle blank values for a mandatory element of a data record. The following execution flow assumes this capability, and the current invention provides a method to set the mandatory data element's value to blank if it is found invalid, so the execution flow will automatically fix the blank value to a valid value.

Figure 1:
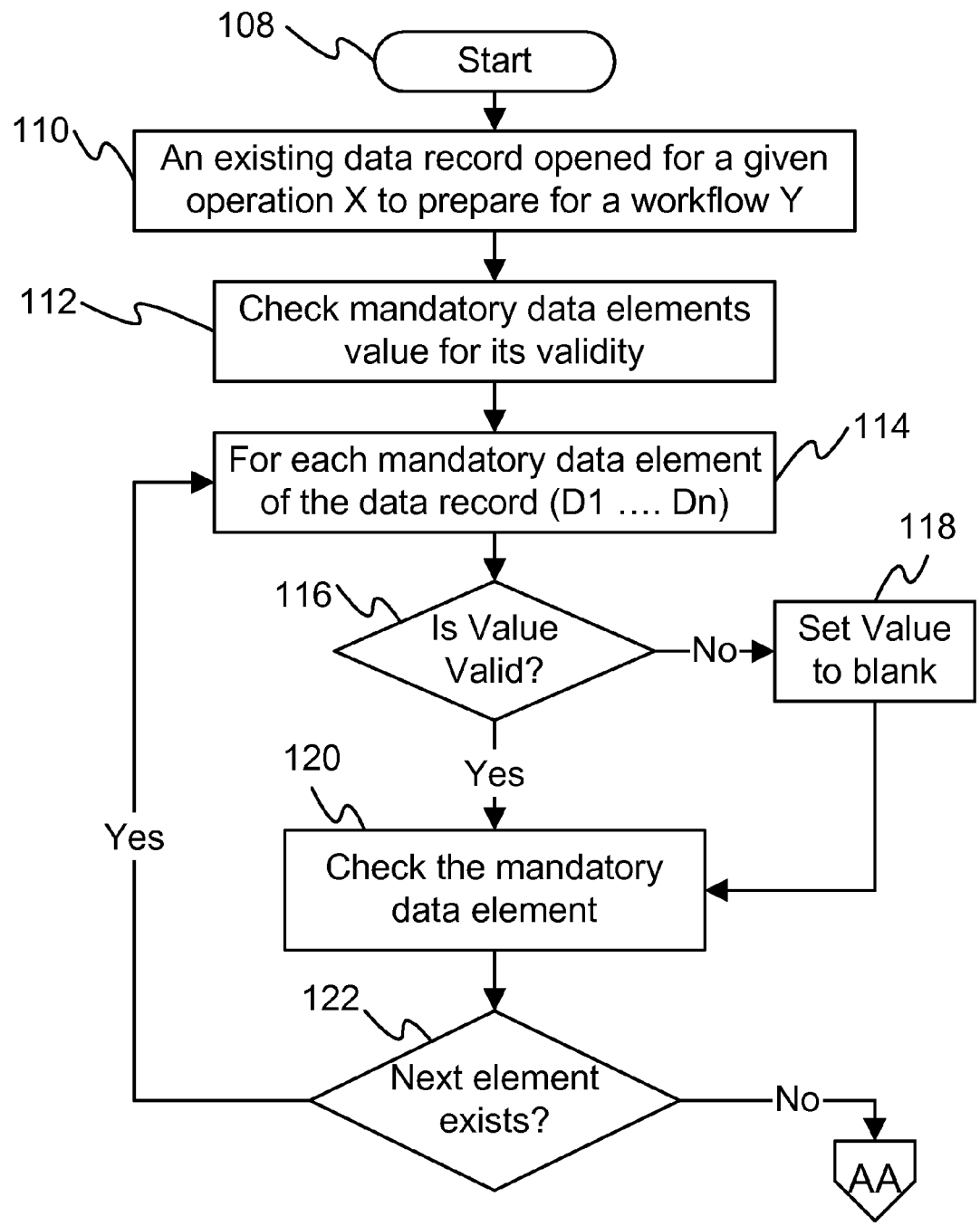
FIG. 1 is a schematic diagram of the data element validation and set value to blank for invalid data elements

Referring more particularly to the drawings, FIG. 1 is a schematic diagram of the data element validation and set value to blank for invalid data elements. In one embodiment a given operation (e.g. software module) has a data record (this could be a complex record). Data Record for Operation X has one or many Data Elements (D1 ... Dn)(110). Some of the Data Elements may be mandatory for the Data Record (i.e., they need to have a valid value)(112). Validity of the data values for the mandatory Data Elements are verified based on relevant validation rules associated with operation X. If a mandatory data element in the data record is found invalid, it is replaced by blank or some appropriate NULL value. If data element's next element exists all the check completed and workflow Y starts.

Figure 2:
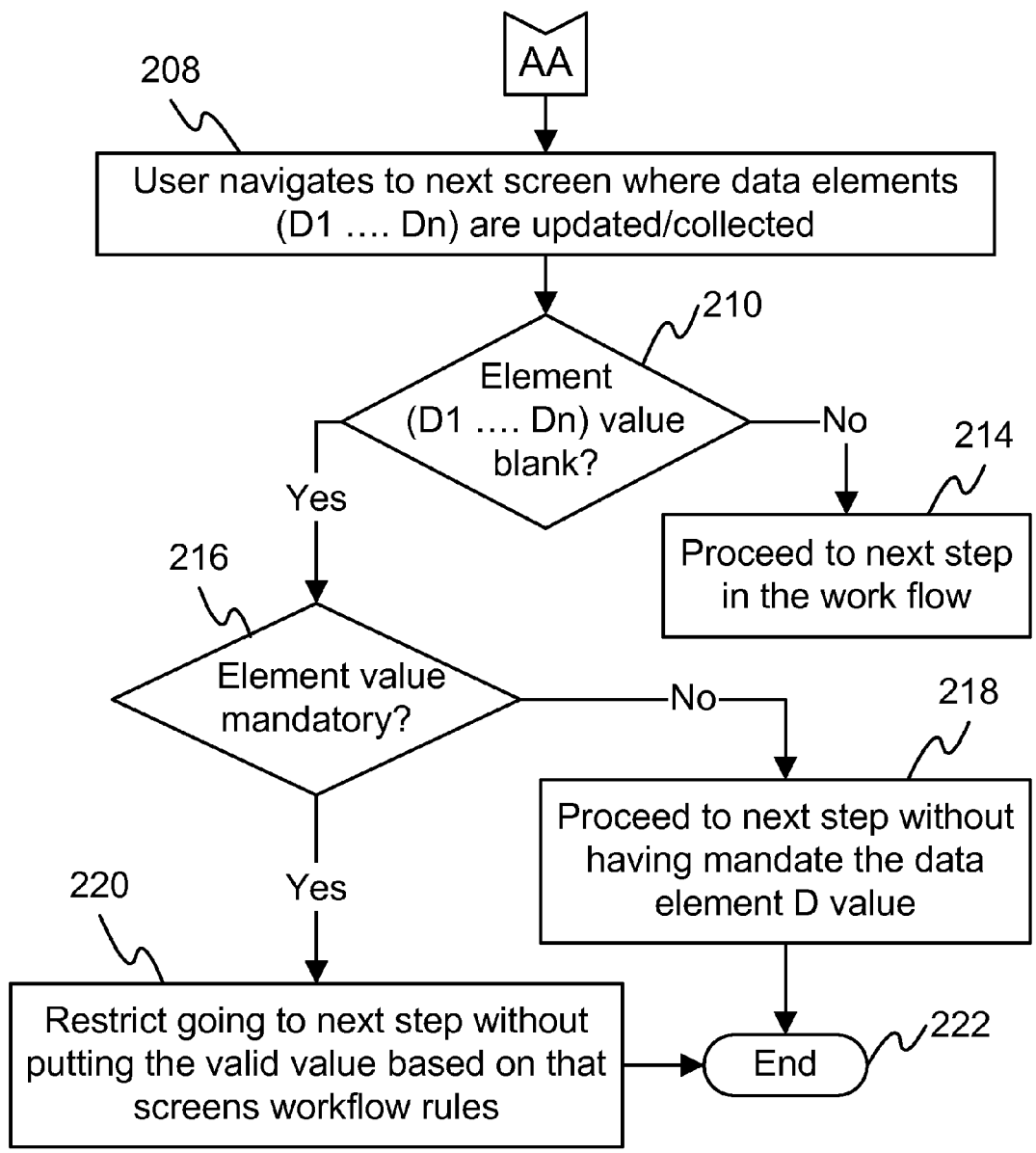
FIG. 2 is a schematic diagram of the handling collected data elements based on the workflow rules.

FIG. 2 is a schematic diagram of the handling collected data elements based on the workflow rules. Workflow Y starts to support operation X. Workflow Y uses one or more of the data elements (D1, . . . , Dn) on a screen where they get collected or updated (e.g. a web page form) (208). If none of the used data elements is blank, proceed to the next step in the work flow (210-212). Otherwise, if none of the mandatory data elements is blank but one or more non-mandatory is blank, proceed to the next step in the work flow without mandating a data value for those blank data elements (218). Otherwise (i.e., if any of the mandatory data elements are blank) (210), a screen work flow rules prevent proceeding to the next step until the user enters a valid value for all mandatory blank data elements (220).

In one embodiment the system is a method for handling invalid condition of a data element during the life cycle of a software module, wherein said software module has a data record;

wherein the data record has one or more data elements;

wherein some of the one or more data elements are required to have valid value;

the method comprising the steps of: a workflow supporting an operation;

wherein the workflow using the one or more data elements on a screen;

checking the validity of the some of the one or more data elements, based on relevant validation rules;

if one of the some of the one or more data elements is invalid, replacing the one of the some of the one or more data elements with a blank or null value;

and if the one of the some of the one or more data elements is a blank or null value, the workflow preventing the operation to go to a next step, until a valid value is entered for the one of the some of the one or more data elements.

Any variations of the above teaching are also intended to be covered by this patent application.

The invention claimed is:

1. A method for handling invalid condition of a data element during the life cycle of a software module:

wherein said software module has a data record;

wherein said data record has one or more data elements;

wherein some of said one or more data elements are required to have valid value as mandatory data elements for an operation;

said method comprising the steps of:

a workflow supporting said operation;

wherein said workflow using said one or more data elements on a screen;

checking the validity of said some of said one or more data elements, based on relevant validation rules, at all steps of said workflow;

if one of said some of said one or more data elements is invalid, replacing said one of said some of said one or more data elements with a blank or null value; and if said one of said some of said one or more data elements is a blank or null value, said workflow preventing said operation to go to a next step of said workflow, until a valid value is entered for said one of said some of said one or more data elements;

wherein said validity of said some of said one or more data elements is changed during said life cycle of said software module with progression of said workflow to one or more next subsequent steps of said workflow.

* * * * *